UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINON COMPOUND AND PROCESS OF MAKING SAME.

No. 814,137.   Specification of Letters Patent.   Patented March 6, 1906.

Application filed October 31, 1905. Serial No. 285,319.

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Anthraquinon Compounds and Processes of Making the Same, of which the following is a specification.

My invention relates to the production of new compounds of the anthracene series, which I have termed "dianthraquinonylamin" compounds. I have discovered, for instance, that by the action of 2-chloranthraquinon on 1-amidoanthraquinon I can obtain a compound which I have termed "dianthraquinonylamin" and which possesses a constitution corresponding to the formula

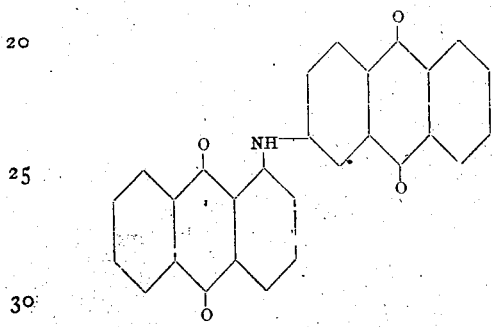

this being the first representative of a new class of anthraquinon compounds. The same new compound can be obtained by condensing 2-amidoanthraquinon with 1-chloranthraquinon, although the reaction in this case does not proceed so favorably. This dianthraquinonylamin consists of crystals which possess a metallic luster and which dissolve in concentrated sulfuric acid, yielding a greenish-blue solution. I prefer to carry out the reaction in the presence of a diluting agent—such, for example, as naphthalene or nitrobenzene—and, further, to add to the reaction mixture a condensation agent, such as copper acetate or a mixture of sodium acetate and copper chlorid.

My invention is not restricted to the use of the above-named compounds, since a similar condensation takes place if instead of 1-chloranthraquinon the compound 1-amido-4-halogen-anthraquinon be condensed with 1-amido-anthraquinon, provided the amido group of the amido-halogen-anthraquinon be protected against reaction by being previously converted into its acidyl derivative—for example, into the acetyl derivative. After the condensation has taken place the acetyl group can be easily split off—for instance, by suitable treatment with sulfuric acid—and the amido compound of the aforementioned dianthraquinonylamin be obtained. Of course instead of the above-mentioned halogen-anthraquinons amido-anthraquinons and halogen-amido-anthraquinons, their homologues and derivatives can be employed. Thus, for instance, by condensing together 1-acetyl-amido-2-methyl-4-chlor-anthraquinon and 1-amido-2-methyl-anthraquinon and by saponifying the reaction product the new compound amido-di-methyl-dianthraquinonylamin can be obtained.

All the compounds of this new class which I have obtained are crystalline and are difficultly soluble in most of the ordinary solvents, but are soluble in concentrated sulfuric acid. They are also sufficiently soluble in anilin and in nitrobenzene to enable them to be recrystallized from these solvents. On being treated with sulfonating agents—for instance, with a mixture of fuming sulfuric acid and boric acid—they are converted into coloring-matters which dye wool from an acid-bath shades which are very fast against the action of light and washing.

The following examples will serve to further illustrate the nature of my invention and the method of carrying it into practical effect; but my invention is not confined to these examples. The parts are by weight.

Example 1: Boil together for about fifteen (15) hours twenty-four (24) parts of 2-chlor-anthraquinon, twenty-seven (27) parts of 1-amido-anthraquinon, one thousand (1,000) parts of naphthalene, twenty-five (25) parts of anhydrous sodium acetate, and five (5) parts of copper chlorid. Allow the mixture to cool and then remove the naphthalene by boiling with toluene, whereupon the dianthraquinonylamin remains in the form of crystals, with a metallic luster. These are soluble in concentrated sulfuric acid, yielding a greenish-blue solution. They are difficultly soluble in most solvents; but they can be recrystallized from nitrobenzene or from anilin. This dianthraquinonylamin can be converted into coloring-matter by heating it with fuming sulfuric acid, with or without the addition of boric acid, at a temperature of from one hundred to one hundred and thirty (130°) degrees centigrade. The coloring-matter dyes unmordanted wool from an acid-bath, yielding brownish-red shades.

Example 2: Boil together for two (2) hours one hundred and fifty (150) parts of nitrobenzene, ten (10) parts of 1-mono-acetamido-2-methyl-4-chlor-anthraquinon, fourteen (14) parts of 1-amido-2-methyl-anthraquinon, ten (10) parts of anhydrous sodium acetate, and two (2) parts of cuprous chlorid. Allow the mixture to cool and then to stand for some time. Filter off the condensation product with the aid of the pump and then wash with nitrobenzene, then with alcohol, then with dilute hydrochloric acid, and, finally, again with alcohol. In order to purify the product still further, it may be recrystallized from nitrobenzene. From the product so obtained the acetyl group may easily be split off by dissolving the product in ten (10) times its weight of sulfuric acid containing about ninety-eight (98) per cent. of $H_2SO_4$ and then precipitating slowly with water, whereupon the reaction mixture becomes hot and the base separates out in a crystalline form. Upon recrystallization from nitrobenzene this base can be obtained in the form of dark-blue needles, with a metallic luster.

Example 3: Boil together for two (2) hours one hundred and fifty (150) parts of nitrobenzene, ten (10) parts of 1-mono-acetamido-2-methyl-4-chlor-anthraquinon, ten (10) parts of 1-amido-2-methyl-4-para-toluido-anthraquinon, ten (10) parts of anhydrous sodium acetate, and two (2) parts of cuprous chlorid and work up the melt in the manner described in the foregoing Example 2.

In the foregoing Examples 2 and 3 instead of 1-mono-acetamido-2-methyl-4-chlor-anthraquinon other acidyl derivatives of 1-amido-2-methyl-4-chlor-anthraquinon or the acidyl derivatives of other 1-amido-4-chlor-anthraquinons—such, for example, as 1.5-diamido-2.4.6.8-tetra-chlor-anthraquinon may be employed.

The compounds obtained according to the foregoing Examples 2 and 3 can by treatment with sulfonating agents be converted into coloring-matters which dye unmordanted wool from an acid-bath blue shades of very great fastness.

Now what I claim is—

1. The process for the production of dianthraquinonylamin compounds by heating an amido-anthraquinon body with a halogen-anthraquinon body in the presence of a condensing agent.

2. The process for the production of dianthraquinonylamin by heating 1-amido-anthraquinon with 2-chlor-anthraquinon in the presence of a condensing agent.

3. The process for the production of dianthraquinonylamin by heating 1-amido-anthraquinon with 2-chlor-anthraquinon in the presence of copper chlorid and sodium acetate.

4. As new articles of manufacture dianthraquinonylamin compounds which are crystalline and difficultly soluble in most of the ordinary solvents, fairly soluble in anilin and nitrobenzene and soluble in concentrated sulfuric acid and which on being sulfonated yield coloring-matters which dye wool from an acid-bath.

5. As a new article of manufacture dianthraquinonylamin which can be obtained from 1-amido-anthraquinon and 2-chlor-anthraquinon, which new compound is crystalline with a metallic luster and difficultly soluble in most of the ordinary solvents, fairly soluble in anilin and nitrobenzene and soluble in concentrated sulfuric acid yielding a greenish-blue solution and which on being sulfonated yields a coloring-matter which dyes wool from an acid-bath brownish-red shades.

In testimony whereof I have hereunto set my hand in the presence of two subscribing witnesses.

MAX HENRY ISLER.

Witnesses:
J. ALEC. LLOYD,
JOS. H. LEUTE.